US007384340B2

(12) United States Patent  
Eguchi et al.

(10) Patent No.: US 7,384,340 B2  
(45) Date of Patent: Jun. 10, 2008

(54) TRADING CARDS INTERACTIVE WITH ELECTRONIC GAME MACHINE AND GAME SYSTEM

(75) Inventors: Katsuya Eguchi, Kyoto (JP); Hisashi Nogami, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 606 days.

(21) Appl. No.: 10/364,459

(22) Filed: Feb. 12, 2003

(65) Prior Publication Data

US 2006/0040746 A1    Feb. 23, 2006

(30) Foreign Application Priority Data

Feb. 13, 2002    (JP)    ............... 2002-035969

(51) Int. Cl.
A63F 9/24 (2006.01)
G06F 15/20 (2006.01)
(52) U.S. Cl. ............... 463/43; 463/1; 235/375
(58) Field of Classification Search ........... 463/42, 463/11, 43, 29
See application file for complete search history.

(56) References Cited

U.S. PATENT DOCUMENTS

| | | | | |
|---|---|---|---|---|
| 5,212,368 | A * | 5/1993 | Hara | 235/375 |
| 5,662,332 | A * | 9/1997 | Garfield | 273/308 |
| 6,200,216 | B1 * | 3/2001 | Peppel | 463/1 |
| 6,419,584 | B1 * | 7/2002 | Sakamoto et al. | 463/43 |
| 6,468,162 | B1 * | 10/2002 | Nakamura | 463/43 |
| 6,554,702 | B2 * | 4/2003 | Mahar et al. | 463/11 |
| 2002/0028710 | A1 | 3/2002 | Ishihara et al. | |
| 2003/0022708 | A1 * | 1/2003 | Yano et al. | 463/11 |

FOREIGN PATENT DOCUMENTS

| | | |
|---|---|---|
| JP | 5-30475 | 5/1993 |
| JP | 2001198602 | * 6/2001 |
| JP | 2001-204874 | 7/2001 |
| JP | 2001-334012 | 12/2001 |

OTHER PUBLICATIONS

Office Action issued on Aug. 17, 2007 in corresponding Japanese Application No. 2002-035969 and partial English language translation.
Konami Official Guide Perfect Series *Genso Suikoden* Card stries Perfect Guide, Japan, Konami Co., Ltd. Oct. 25, 2001, 1st Version, pp. 7-19, pp. 23-26, ISBN4-7753-0007-5.

* cited by examiner

*Primary Examiner*—Robert E Pezzuto
(74) *Attorney, Agent, or Firm*—Nixon & Vanderhye P.C.

(57) ABSTRACT

Trading cards consist of a single rule card and a plurality of character cards. The rule card is formed with a data recording area on its front surface. The data recording area of the rule card is mechanically readably recorded with rule program data determining a rule of an interactive game. Each character card is formed with a data recording area on its front surface. The data recording area of the character card is mechanically readably recorded with parameter data. An electronic game machine is loaded with a cartridge, and on the electronic game machine, the interactive game according to the rule program data read from the rule card and the parameter data read from the character card is executed on the basis of a game program of the cartridge.

39 Claims, 11 Drawing Sheets

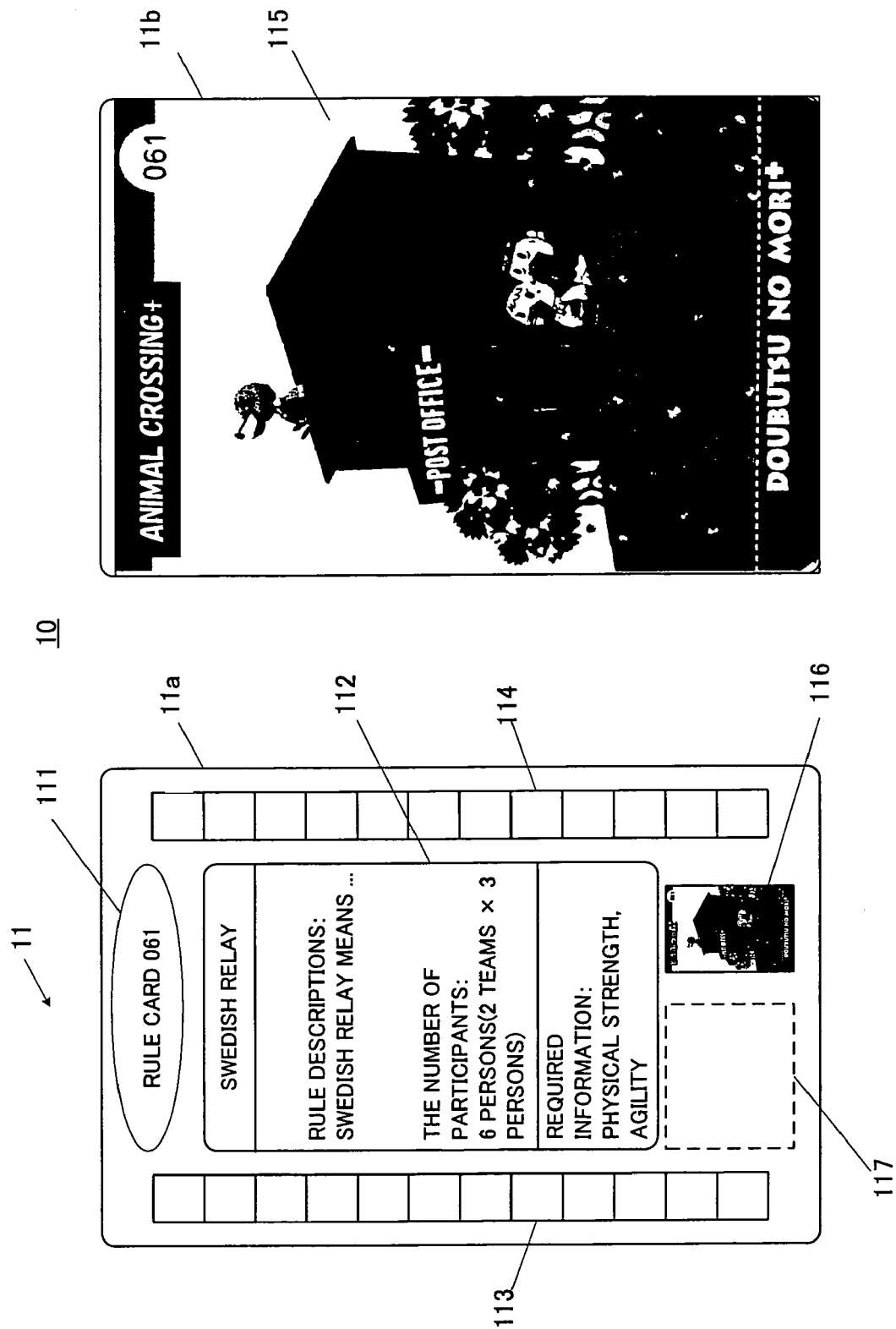

TRADING CARDS INTERACTIVE WITH ELECTRONIC GAME MACHINE AND GAME SYSTEM

BACKGROUND OF THE INVENTION

1. Field of the Invention

The illustrative embodiments relate to trading cards capable of interacting with an electronic game machine and a game system utilizing the same. More specifically, the illustrative embodiments relate to trading cards including a plurality of character cards and at least one rule card, and a game system capable of implementing a game wherein the trading cards and the electronic game machine interact with each other (hereinafter, "interactive game").

2. Description of the Prior Art

Conventionally, Japanese Patent Publication No. 5 (1993)-30475 discloses a card-game toy using an electronic game machine and barcode-recorded cards by combining them. This card-game toy is called BARCODE BATTLER as a product name. This card-game toy utilizes numeric data recorded as barcodes on the cards, so that the cards used by an offensive player are allowed to battle against the cards used by a defensive player, whereby it is possible to compete in superiority or inferiority in barcode-recorded numeric data. The card used in the card-game toy has barcode (so-called one-dimensional barcode) data configured by a combination of two kinds of bars different in thickness arranged in a predetermined number in a reading direction (horizontal direction). The barcode is optically read out and used for the electronic game.

However, in the conventional card-game toy, since competition utilizes the data recorded on the card only and the amount of data recorded on the barcode is insufficient, a battle game only is possible between an offensive and a defensive player. The electronic game is liable to be monotonous and interest will be lost in the game.

Furthermore, since a conventional game card is only recorded with data for a battle game, even if it the cards comprise a character figure depiction, etc., willingness to collect the cards is not enhanced, and therefore, it becomes difficult to promote the sales of the cards.

On the other hand, although not compatible with electronic games, conventionally, trading cards are widely known. However, the conventional trading cards are for performing a card game utilizing only the cards, and common figures are depicted on the rear surfaces of a set of the trading cards, and individual characters are depicted on the front surfaces of the individual trading cards. Accordingly, the conventional trading cards do not allow the player to play the electronic game and also have a small character figure (one half or smaller of a surface area of a card), thus not enhancing player eagerness to collect.

Furthermore, in a conventional electronic game machine such as a portable game machine, a television game machine, etc., a detachable game information storage medium such as ROM, cartridge, CD-ROM and etc. is utilized, and by exchanging the game information storage medium, a content of a game can be changed. In addition, a game system of a server system can be utilized. This system is capable of playing a game by downloading game data from the server, so as to store the data into an internal memory of a television game machine or the cellular phone, and charging the user.

However, in the conventional electronic game machine and the server system, it is impossible to change the content of the game, except by exchange of the game information storage medium or download of another game. Because the cost of a new game information storage medium or the download of the game information is high, it is difficult to provide various games at low cost.

SUMMARY OF THE INVENTION

One feature of the illustrative embodiments is to provide novel trading cards and a game system utilizing same.

Another feature of the illustrative embodiments is to provide trading cards and a game system utilizing the same, in which it is possible to play a game on an electronic game machine using the trading cards. This allows the player to play a game wherein the electronic game machine and the trading cards are related to each other (i.e., interactive game), while enhancing player willingness to collect the cards.

A further feature of the illustrative embodiments is to provide trading cards and a game system utilizing the same, in which it is possible to realize an interactive game utilizing trading cards consisting of character cards having different natures and a rule card. This game can be played with wide variety for the player, thus offering enjoyment over a longer time than a game played with only game cards or by only an electronic game machine.

An additional feature of the illustrative embodiments is to provide trading cards and a game system utilizing the same, capable of increasing the variety of an interactive game. Variety is increased because the game depends upon an order of usage of different kinds of character cards and a combination of the character cards and the rule card.

Another feature of the illustrative embodiments is to provide trading cards and a game system utilizing the same, capable of increasing the variety of gameplay at low prices. Different kinds of trading cards can be purchased at a relatively cheap price even if an external information storage medium to be applied to an electronic game machine is not exchanged.

The illustrative embodiments comprise trading cards (10) associated with an electronic game machine including an external information reading means (showing a parallelism with the data reader 35 in FIG. 2) for reading data recorded on the trading cards, a processing means (CPU 341 and CPU 21 in FIG. 2) for processing the data read by the external information reading means, and an image display means (LCD 26) for displaying an image based on a processing result by the processing means, and wherein the trading cards include at least one rule card (11) and a plurality of character cards (12A and 12B).

Each of the plurality of character cards is used for playing an electronic game and is formed with a first data recording area (123) recorded in a mechanically readable manner, with character specific parameter data on one main surface thereof, and a first visual information recording area (124) in which identifying information (121) for identifying a kind of the character card and character information to increase inclination to collect are recorded in a visually recognizable manner on at least one of the one main surface and the other main surface. The rule card is, on one main surface thereof, formed with a second data recording area (113), in which rule data for determining a rule of the game utilizing the trading cards is recorded in a manner that the same is mechanically readable by the external information reading means, whereby an interactive game is playable by making the external information reading means read the at least one rule card and a plurality of character cards.

According to the illustrative embodiments, it is possible to obtain novel trading cards and a game system utilizing the same, capable of playing the interactive game utilizing the trading cards on the electronic game machine, while enhancing player willingness to collect the cards.

Furthermore, since the interactive game can be played by use of the trading cards, it is possible to obtain an interactive game played with wide variety and with increased player interest, thus offering more enjoyment over a long term than a game played with game cards only or by an electronic game machine only. In addition, various kinds of character cards increase the variety of the interactive game depending on the order in which they are utilized and their combination with the rule card. Also, even if the external information storage medium applied to the electronic game machine is not changed, it is possible to enjoy playing a different game by changing low-cost trading cards applied thereto, and therefore, it is possible to increase the variety of the game at low prices.

In one aspect of the illustrative embodiments, the first visual information recording area and the parameter data recording area are formed on the surfaces different from each other. This makes it possible to depict enlarged visual information such as an attractive character figure, etc., and therefore it is possible to encourage willingness to collect.

More specifically, the character card is depicted with enlarged visual information on the main surface formed with the first visual information recording area and depicted with reduced visual information (125) on the other surface formed with the parameter data recording area, and therefore, visual information (124) such as an attractive character figure and etc. is depicted in enlarged and reduced manner on both surfaces, and whereby it is possible to further encourage willingness to collect.

In another aspect of the illustrative embodiments, as to the character card, the character information recorded in the first visual information recording area is a character figure, and text information in relation to the character figure is recorded on the main surface formed with the first data recording area, and therefore, visual information such as a figure, a descriptive text and etc of attractive characters is recorded. Thus, it is possible to further encourage willingness to collect.

Similarly, where the rule card is also formed with a second visual information recording area (115) and recorded with visual information, both the character card and the rule card can be collectable, and therefore, it is possible to encourage player willingness to collect. That is, since the rule card is also formed with the second visual information recording area (115) on the one main surface and the second data recording area (113) on the other surface, this makes it possible to display an enlarged the visual information such as an attractive character figure, etc., and therefore, it is possible to encourage player willingness to collect.

According to another aspect of the illustrative embodiments, the rule card is recorded with setting data, for setting the kind of the parameter data to be read from the character card, in the second data recording area together with the rule data. Accordingly, it is possible to obtain trading cards capable of realizing various kinds of interactive games depending on the setting data.

In one example, a third recording area for setting data is formed on one main surface of the rule card in addition to the second data recording area. Then, by use of the setting data, it is possible to select arbitrary parameter data utilized for the interactive game out of a plurality of parameter data recorded on the character card, and therefore, it is possible to increase varieties for displaying images of the interactive game as to the same character card.

A game system according to the illustrative embodiments is a game system for performing an interactive game associated of trading cards with an electronic game machine utilizing trading cards constituted by at least one rule card and a plurality of character cards.

Each of the plurality of character cards is used for playing an electronic game using the character cards, and is formed with a first data recording area recorded in a mechanically readable manner with character specific parameter data on one main surface thereof, and a first visual information recording area in which identifying information for identifying a kind of the character card and character information causing an inclination to collect are recorded in a visually recognizable manner on at least any one of the one main surface and other main surface.

The rule card is, on one main surface thereof, formed with a second data recording area in which rule data for determining a rule of a game utilizing the trading cards is recorded in a manner that the same is mechanically readable by the external information reading means.

The electronic game machine includes the external information reading means for reading the parameter data recorded in the first data recording area of the each character card and the rule data recorded in the second data recording area of the rule card, a program data storage means for storing program data, a processing means for processing each of the data read by the external information reading means according to the program data, and a display means for displaying an image based on a processing result of the processing means. Then, the external information reading means reads the at least one rule card and a plurality of character cards in combination thereof to use the read data by the processing of the processing means, so that an game image data is generated and displayed on the display means on the basis of the rule data of the electronic game machine recorded on the rule card by use of the parameter data stored on the character card. Thus, it is possible to obtain a novel game system.

According to a game system of the illustrative embodiments, a game of the electronic game machine can be played utilizing the trading cards. Accordingly, the trading cards can be used as a tool for playing an interactive game, and this gives the player not only enjoyment of collecting the trading cards but also enjoyment of playing the interactive game. Furthermore, depending upon of the order in which different kinds of character cards and a combination of the rule card and the character cards are utilized, it is possible to increase the variety of the interactive game. Therefore, even if a program of the electronic game machine is not changed, simply by changing the kind of the low-cost trading cards, especially, the rule card applied thereto, it is possible to enjoy different kinds of games and play multiple varieties of games at low prices.

In one aspect of the illustrative embodiments, the number of character cards utilized in the interactive game can be set. Accordingly, it is possible to obtain a game system capable of realizing various image displays depending on the number of character cards used.

Furthermore, by changing a reading order of a plurality of kinds of character cards, an image display of the interactive game can be changed and therefore, various kinds of image displays can be realized.

In the game system, utilization of a plurality of rule cards allows the player to play the interactive game with a different rule for each rule card.

According to one aspect of the illustrative embodiments, where number-of-cards data making a plurality of kinds of character cards usable is recorded on the rule card, it ensures that a predetermined number of character cards are used (process in step S51 and S54 in FIG. 8).

In addition, when enjoying the interactive game associated with the electronic game by utilizing a plurality of character cards, the game machine enables the detection of an error if some character cards do not have a predetermined relation with the rule card, and therefore, it is possible to notify the player that a character card having different rule is mixed in (process in step S37, S38, S50 and S53 in FIG. 8).

The above described aspects and other features, aspects and advantages of the illustrative embodiments will become more apparent from the following detailed description of the illustrative embodiments when taken in conjunction with the accompanying drawings.

BRIEF DESCRIPTION OF THE DRAWINGS

FIGS. 1A, 1B and 1C are plane views showing trading cards of one embodiment of the present invention;

DETAILED DESCRIPTION OF THE PREFERRED EMBODIMENTS

Figure 1B:
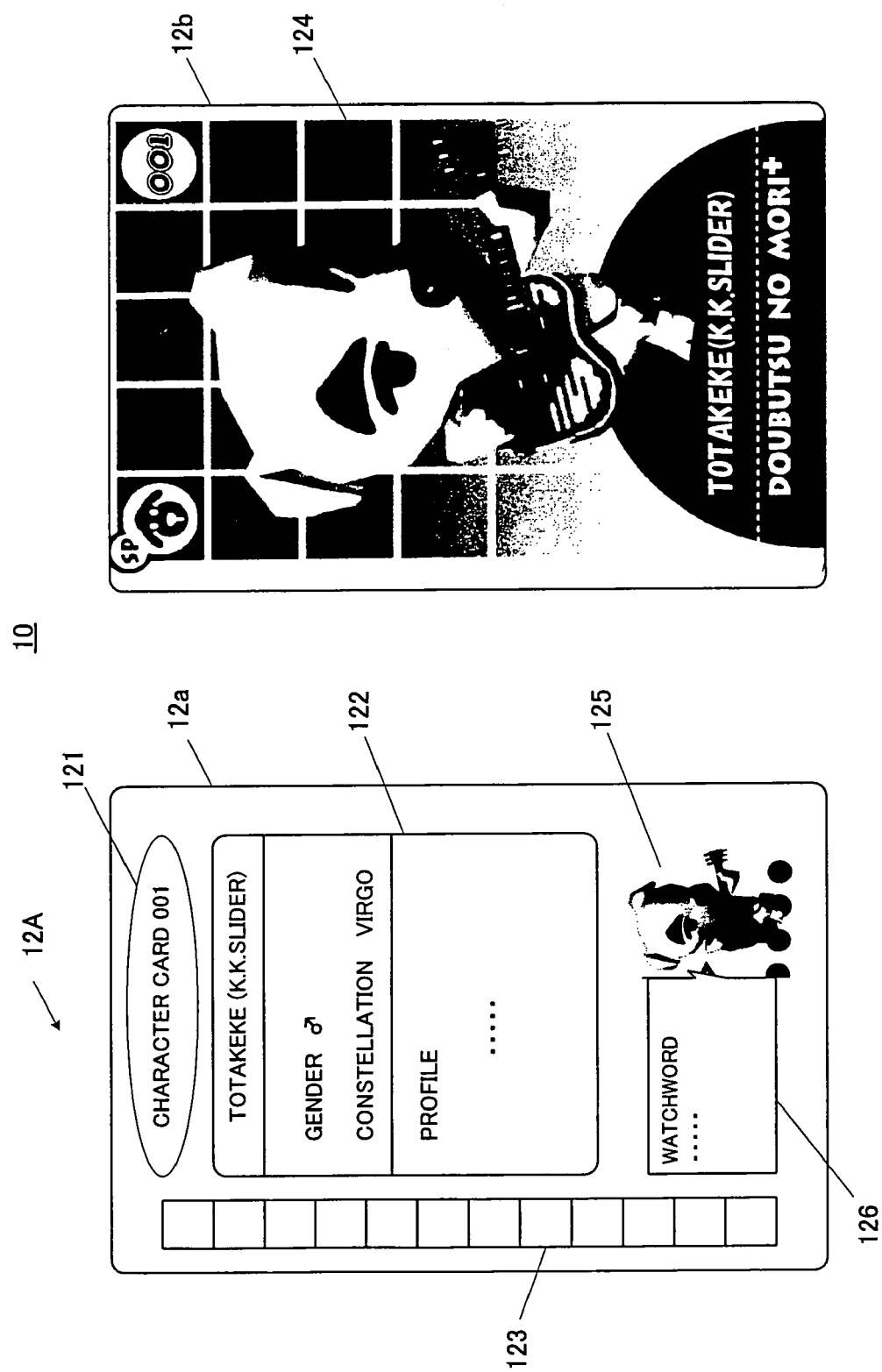
Figure 1C:
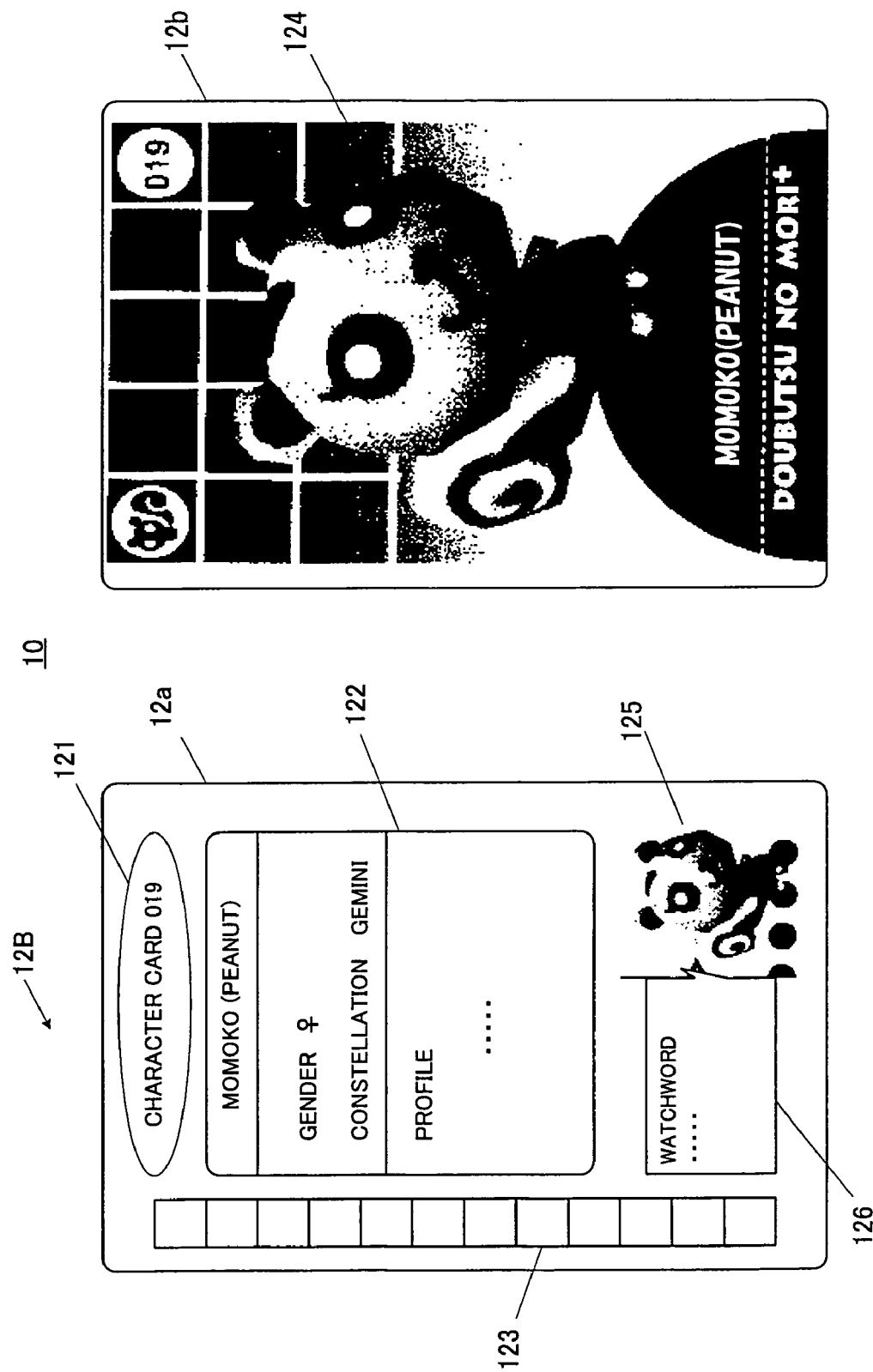

FIG. 1A, FIG. 1B and FIG. 1C are plane views showing one embodiment of trading cards 10 according to the present invention. The trading cards 10 include at least one rule card 11 and a plurality of character cards 12A, 12B (it is noted that only two character cards are shown in the drawings, and others are omitted). Although one rule card 11 and two character cards 12A and 12B are shown in this Figure, it is likely that more than one rule card 11 and more than two character cards 12A, 12B . . . are utilized when playing an interactive game.

The rule card 11 is formed with the following recording areas on a front surface (one main surface) 11a and a rear surface (other surface) 11b of a quadrate-shaped card. That is, the front surface 11a is formed with a card-type recording area 111 in an upper portion, a rule description recording area 112 below it, and data recording areas 113 and 114 at both sides of the rule description area 112. The card-type recording area 111 is recorded with card-type data (card No. and so on) for specifying a nature of a card (difference between the rule card and the character card) and a type of cards having the same nature (the rule card in this case). The rule description recording area 112 is visually recognizably recorded (printed) with descriptive text of a rule depending on the type of the rule card 11 text information such as letters, numerals, symbols and etc. The data recording areas include a rule data recording area 113 and a setting data recording area 114.

The rule data recording area 113 is mechanically readably recorded with program data for deciding a rule of the interactive game associated with the electric game machine realized by the rule card 11. As one example, in a case where the rule card 11 is a card playable for Swedish Relay (which is similar to a standard 4×100 relay except that each runner progressively runs farther than the previous one), the data recording area 113 is program data in which a rule of the Swedish Relay is programmed, the rule description recording area 112 is recorded with descriptive text (an explanation of the rule, the number of participants, utilizing physical strength and agility as necessary parameter information, and so on) describing the rule of the Swedish Relay.

The rear surface (the other surface) 11b of the rule card 11 is formed with a character information recording area 115. The character information recording area 115 is visually recognizably depicted with a character figure, scene, building, and item figure appearing in the game. This records character information for creating a user inclination to collect or heightening a user desire to collect the cards.

On the other hand, the character cards 12A, 12B, are, in one example, formed with the following recording areas in which the following information or data are respectively recorded on an front surface (one main surface) 12a and on a rear surface (the other surface) of a quadrate-shaped card as shown in FIG. 1B or FIG. 1C. That is, each of the character cards 12A and 12B is formed with a card-type recording area 121 in an upper portion, a character specific recording area 122 for recording character specific information below the card-type recording area and a data recording area 123 formed along any one of sides of the character specific area 122. The card-type recording area 121 is visually recognizably recorded (printed) with type data (card No. and so on) for specifying a nature of a card and a type of cards having the same nature (the character card in this case). The character specific information recording area 122 is, using text information such as letters, numerals, symbols and etc., visually recognizably recorded (printed) with information specific to a character (e.g., name of character, gender, constellation, profile, message such as a favorite word and etc.) representative of individuality or an attribute of the character decided by the type of the character cards 12A, 12B, . . . . The data recording area 123 is mechanically readably (optical, electrical, magnetic and etc.) recorded with parameter data specific to the character.

Furthermore, each of the character cards 12A and 12B is formed with a character information recording area (first information recording area) 124 on the rear surface (the other surface) 12b. The information recording area 124 is visually recognizably recorded with character information (such as a figure of an animal appearing in the game) to heighten or create a user inclination to collect the cards. Specifically, a character figure, a background, a building or an item figure appearing in the game is depicted as the character information as necessary.

Thus, if the character information recording area 124 is formed on the rear surface 12b different from the front surface formed with the data recording area 123, it is possible to increase the displayed size of a character figure, providing more attractive trading cards to the user.

Each of the character cards 12A, 12B, is preferably formed with a reduced recorded area 125 and other recording area 126 in a blank region on the front surface 12a. The reduced recorded area 125 is printed with a smaller character figure of the character figure (animal) printed in the information recording area 124 on the rear surface. The other recording area 117 is printed with message information or the watchword from the character to the player, or a password to be input to the electronic game machine through a player operation.

In the same manner, the rule card 11 shown in FIG. 1A may be formed with a reduced recorded area 116 and other recording area 117 in a blank region on the front surface 11a. The reduced recorded area 116 is printed with a smaller character figure of the character figure on the rear surface, and the other recording area 117 is printed with usage of the rule card.

It is possible to use an optically readable recording scheme, an electrically readable storing scheme, a magnetically readable recording scheme or the like as the method for mechanically readably recording the data in the above-described data recording areas 113, 114 and 123, for example.

The optical recording method uses, for example, printing with a two-dimensional barcode. The two-dimensional barcode has a recording area formed by gathering together, in a scanning direction, unit blocks or lattices each having a predetermine area (e.g. 3×3 square mm), whereby dots of each block are vertically and horizontally distributed. Furthermore, the printing is made such that the dot distribution is varied in each column (or line) as divided at a constant interval in any one of the vertical and horizontal directions. This makes it possible to record a great deal of data (e.g. approx. 100 bytes of data per one unit block). In the two-dimensional barcode recording scheme, in addition to the parameter data to be inherently recorded, block Nos. are recorded as the data not to be used in game processing but to distinguish the data arrangement order in each block. This makes it possible to read the cards even in a case where the reading sequence or order is arbitrarily changed when the data recording areas 113, 114 and 123 are formed in a reading (moving) direction of the trading card 10 and/or in a plurality of locations in one card. And, by changing the arrangement of the data after reading, the read data is easy for use in the electronic game machine.

In the electrical recording method, the trading card 10 is configured, for example, by an IC card, and data input/output terminals (not shown) are formed in the vicinity of the location that the IC is formed, and the parameter data is written or stored in advance on the non-volatile memory (ROM) within the IC. In this case, the ROM capacity within the IC is different depending upon the integration degree of the IC chip. When the capacity is insufficient only with the ROM, it is possible to use a writable/readable memory (RAM) within the IC chip. In this case, more data can be recorded than in the optical recording method even if a recording area is small.

In the magnetic recording method, magnetic stripes are formed in the data recording areas 113, 114 and 123 in order for magnetic recording onto the magnetic stripes by use of a magnetic head.

These recording methods, having merits and disadvantages, may be properly selected taking into consideration a use purpose and advantages and disadvantages. For example, the two-dimensional barcode has great capacity and is inexpensive but has a lowered reading accuracy when dusty or scratched, and it is impossible to write new data, and the data reader is expensive. The IC card has great capacity, high reading accuracy, can be read at high speed, it is possible to write and read data, and the data reader/writer is cheaply available. But the cost of the IC card itself is expensive. With the magnetic stripe, writing and reading is possible with an inexpensive structure, but the amount of information that can be recorded is less and the data is readily ruined by proximity to a magnet. Accordingly, a proper recording form may be selected while taking into consideration the purpose of the use of the trading card 10, user age, purchase price, etc.

The description has been made of a case where the rule data recording area 113 and the setting data recording area 114 are formed along the respective longitudinal sides of the rule card 11; however, in a case that an amount of data to be recorded is less, these recording areas may be formed together along only one side. Further, these recording areas may be formed along the longitudinal side and the lateral side, or both of the rectangular sides.

Furthermore, although the description has been made on a case where the rule card 11 or the character cards 12A, 12B, of this embodiment shown in FIGS. 1A to 1C is formed with the data recording areas 113, 114 and 123 along a longitudinal one side or two longitudinal sides of the card, the data recording areas may be formed along the two sides of one lateral side and one longitudinal side, the three sides of two longitudinal sides and one lateral side or the four sides of two longitudinal sides and two lateral sides. Thus, the amount of information to be recorded can be increased by increasing the number of sides or locations forming the information recording areas 113, 114, 123. Consequently, the content of an electronic game using the trading cards 10 can be diversified.

Furthermore, the rule card 11 formed with one or a plurality of data recording areas 113 and 114 or the character cards 12A, 12B formed with the data recording area 123 is recorded with a block No. in each block included in the data recording areas 113, 114, 123 so that, even if there is a difference in reading direction and/or order or sequence, the read data out of each block can be rearranged according to the block No. order after reading all the blocks to be used for game processing.

What follows is a description of a configuration of the game system for performing the interactive game by use of the above-described trading cards 10. That is, a description is specifically made of an embodiment in a case where the electronic game machine is a portable game machine 20, and a recording scheme applied to the respective recording areas 113, 114 and 123 of the trading card 10 is the optical recording method utilizing the two-dimensional barcode.

The trading cards 10 are collected as collection cards, distinguished by the figures or the passwords printed on the character information recording areas 115 and 112 (and/or in addition to the reduced recorded areas 116 and 125), and utilized for the interactive game associated with the electronic game machine by use of the rule data and the parameter data recorded on the data recording areas 113, 114 and 123. The following description is made on a case where a content of the game (rule) associated with the trading card 10 with the electronic game machine is a competition game (Swedish Relay), and the parameter data of the character cards 12A, 12B are parameters utilized in the interactive game based on the rule.

Figure 2:
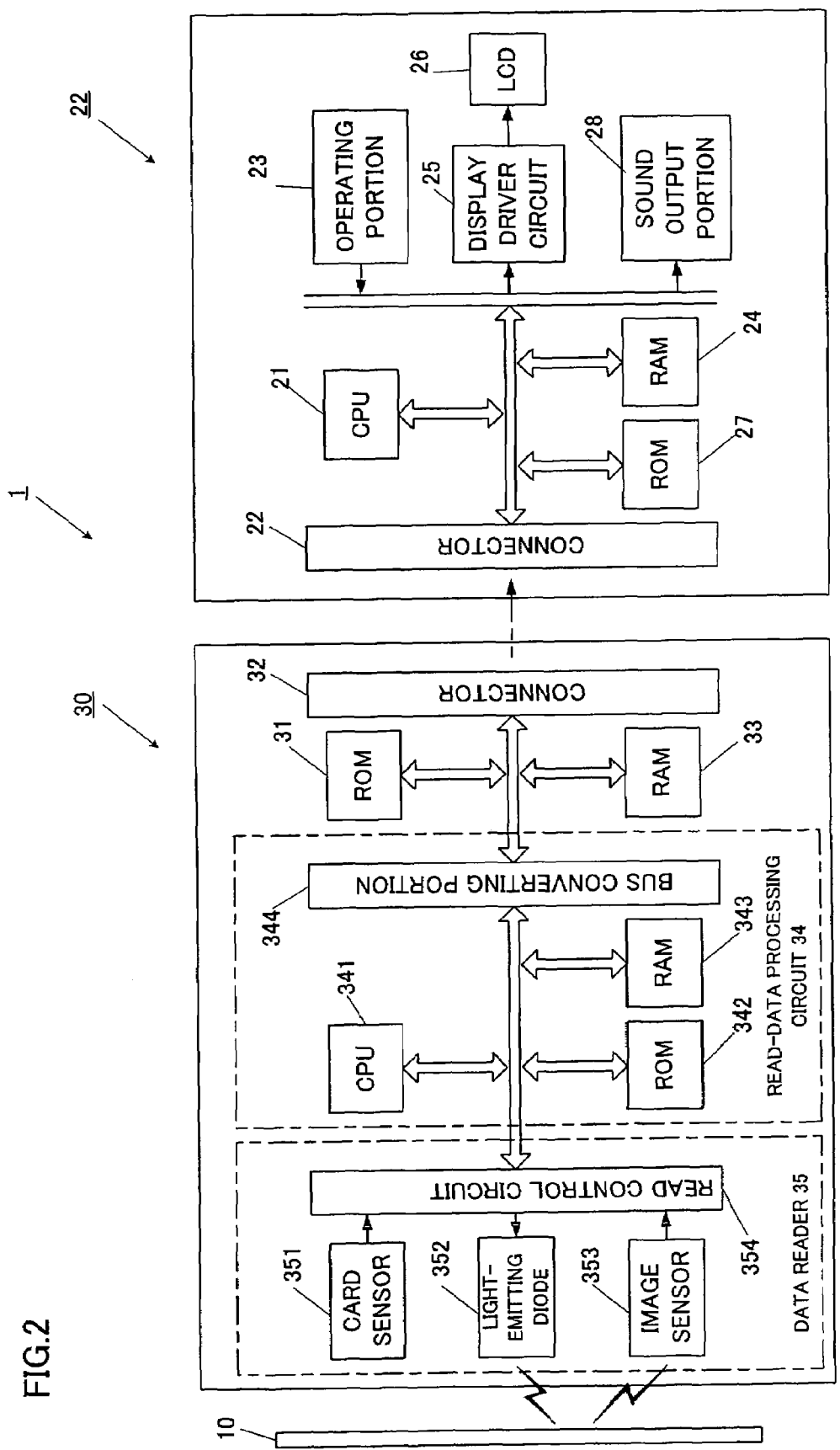
FIG. 2 is a block diagram showing a game system utilizing the trading cards of the embodiment of the present invention.

FIG. 2 is a block diagram of a game system associated with the electronic game machine using the trading cards according to the illustrative embodiments. In FIG. 2, a game system 1 comprises the electronic game machine (hereinafter, correctively referred to as "game machine") 20 such as a portable game machine or a video game machine and etc. and a game cartridge as an example of a game information storage medium (hereinafter, briefly referred to as "cartridge") 30 in addition to the above-described trading cards 10.

The game machine 20 includes a CPU 21 as an example of processing means. The CPU 21 is connected with a connector 22 to which the game cartridge 30 is removably attached, an operating portion 23, a RAM 24 for temporarily, writably/readably storing data, and a display drive circuit 25 via a bus.

The display drive circuit 25 is connected with a liquid crystal display (LCD) 26. The game machine 20 further includes a built-in ROM 27 and a sound output portion 28. The ROM 27 stores a program for processing at a start-up of the CPU 21 and realizing, in a software fashion, the function of display drive circuit 25. The sound output portion 28, when the CPU 21 applies as digital data the sound effect or sound for a game stored in a ROM 31, converts the sound data into an analog sound signal to be output through a speaker (not shown).

It is noted that where the game machine 20 is a video game machine, a TV monitor (not shown) is connected in place of the LCD 26, and a video signal generating circuit (not shown) is provided in place of the display drive circuit 25 to thereby convert the image display data into an image signal (video signals or RGB signals).

The game information storage medium 30 is a game cartridge configured by incorporating within a case (not shown) a non-volatile memory or fixedly storage memory (e.g. ROM) 31, a connector 32, a writable and readable memory (RAM) 33, a read-data processing circuit 34 and a data reader 35. The connector 32 is to electrically connect between the connector 22 of the game machine 20 and the cartridge 30, and uses an edge connector or the like forming a plurality of contacts in an end edge of a print circuit board. The ROM 31, the RAM 33 and the read-data processing circuit 34 are connected to the connector 32 via the bus. The read-data processing circuit 34 is connected with the data reader 35.

The ROM 31 is fixedly stored with an initial setting program for performing an initial setting at a start-up of the game, a screen display program for displaying a menu selection screen, and as necessary a game program in a case of playing the electronic game machine singly.

The RAM 33 is a writable memory for temporarily storing the rule data and setting data read from the rule card 11 by the data reader 35 and the parameter data read from the character cards 12A, 12B. The RAM 33 is backed-up with a battery or the like (not shown) in order to prevent the data from being lost even upon removal from the game machine 20. In addition to or in place of the RAM 33, a flash memory (flash ROM) may be provided that does not require backup by a battery. The RAM 33 includes areas or tables which stores in correspondence to the kinds of the trading cards having been read the parameter data of the respective trading cards (see FIG. 6 described later). Also, the RAM 33 includes various storage areas such as an area to store the dot data of a predetermined number of characters, an area to store the text data of a predetermined number of characters and an area to store program data for the interactive game.

The data reader 35 mechanically reads the rule data and the setting data recorded in the data recording areas 113 and 114 of the rule card 11 and the parameter data recorded in the data recording areas 123 of the character cards 12A, 12B. If the data recorded in the data recording areas 113, 114, 123 is recorded (or printed) with the two-dimensional barcode, for example, an optical reader is utilized. If stored in the IC card, an IC-card reader is used. Where recorded on the magnetic stripe, a magnetic reader is used. The read-data processing circuit 34 is a circuit for processing the data read by the data reader 35, which converts the read data into data processable by the CPU 21 by making a proper processing depending upon the recording scheme.

More specifically, for example, where the parameter data is recorded by the two-dimensional barcode, the data reader 35 includes a card sensor 351, a light-emitting diode 352 or a CCD sensor (or image sensor) 343, and a read control circuit 354. The card sensor 351 detects a period of between a timing that a tip end of the trading card 10 is inserted into the guide 361 and a timing that a rear end thereof has gone out of the guide 361 (see FIG. 3), and during this period, generates a pulse so as to enable the light-emitting diode 352, the CCD sensor 353 and the read control circuit 354. The light-emitting diode 353 makes light-emission during the period of the pulse input from the card sensor 351 so as to illuminate the data recording areas 113 and 114 of the rule card 11 or the data recording areas 123 of the character cards 12A, 12B. The CCD sensor 353 receives reflected light from the light-emitting diode 352 and optically reads the various data such as the rule data, the parameter data and etc. recorded on the data recording areas 113, 114, 123. The sensor 353 temporarily stores the dot pattern per the unit block of the two-dimensional barcode, and dissolves the dot pattern into dot data of one line in the moving direction of the trading card 10 (or one line in a direction orthogonal to the moving direction), and then converts the dot data into bit series data to supply the same to the read control circuit 354. The read control circuit 354 converts the read data into a data format suitable for temporary storage within a RAM 343 (described later) so as to supply the same to the read-data processing circuit 34.

The read-data processing circuit 34 includes a CPU 341, a ROM 342, the RAM 343 and a bus converting portion 344. The ROM 342 fixedly stores a program for conversion of the read data read by the data-reader 35 into a predetermined format, a program for controlling writing to the RAM 343, and a program for controlling the transfer to the CPU 21 through the bus converting portion 344. Then, the CPU 341 writes and temporarily stores the read data to the RAM 343 on a byte-unit basis on the basis of a program stored in the ROM 342, sequentially reads the data, and makes the bus converting portion 344 convert the data into a predetermined format to be transferred to the portable game machine 20.

Figure 3:
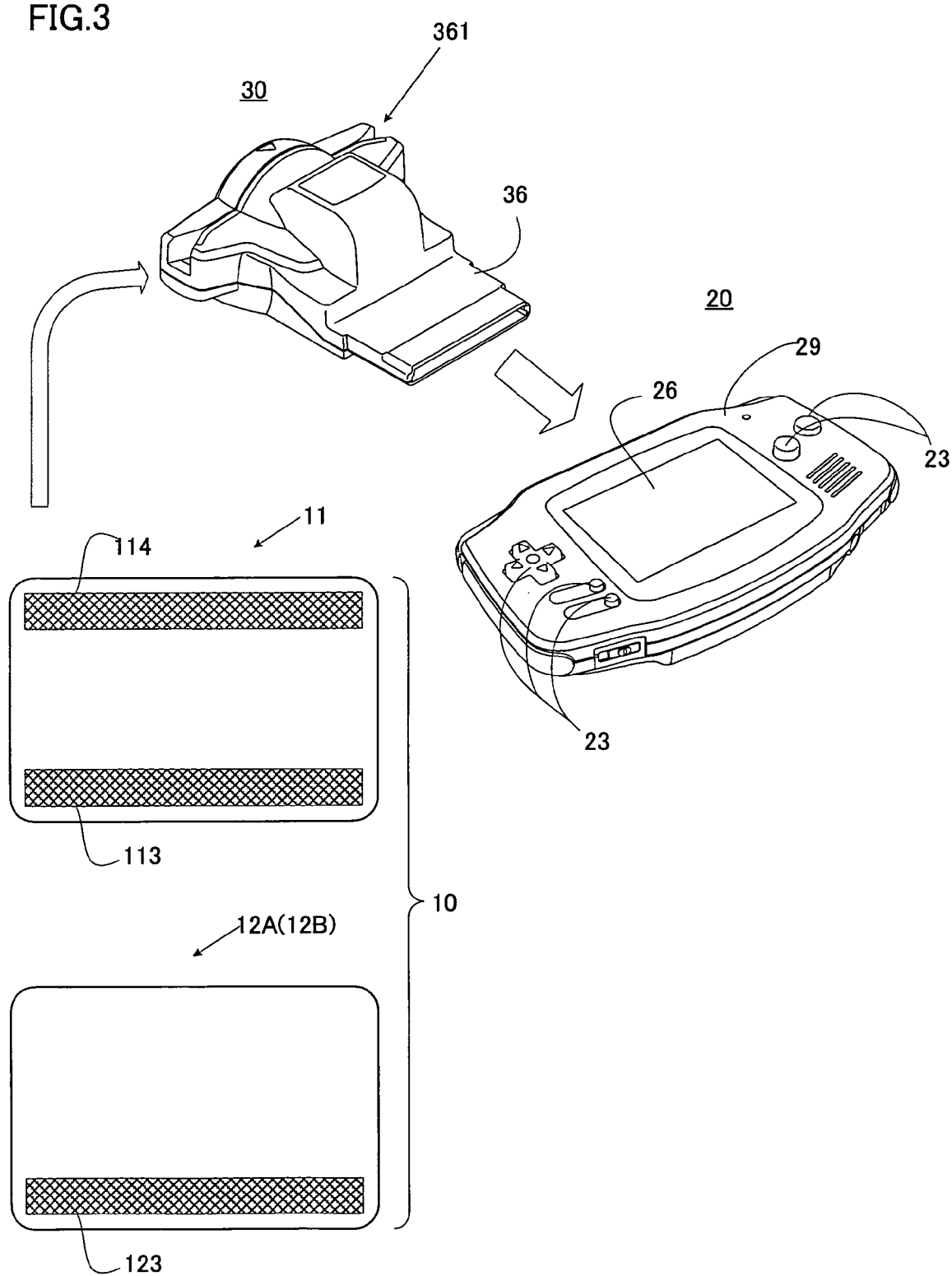
FIG. 3 is an appearance view showing one example of a game machine having a configuration of FIG. 2 game system and a cartridge.

FIG. 3 is a view of a game system of the illustrative embodiments. In FIG. 3, the portable game machine 20 has an operating portion 23 and the LCD 26 arranged on one main surface (surface in FIG. 3) of a flat-formed housing 29. The operating portion 23 includes a direction designating key for designating a moving direction of a character, a motion key for instructing an action of the character, a start key for instructing a start of the game, etc. The game housing 29 has an insertion hole (not shown) formed in a back-surface upper portion thereof to receive therein a cartridge 30.

The cartridge 30 includes a housing 36 having an outer shape at a part of the housing for insertion in the insertion hole of the housing 29. The housing 36 has a guide 361 formed to be exposed above as attached to the portable game machine 20. The guide 361 has a groove for guiding the trading cards 10 comprising rule cards 11 and/or character cards 12A, 12B, in a moving direction. The above-described data reader 35 is incorporated in the vicinity of the guide 361 within the cartridge 30 so as to read the data recorded in the data recording area 113, 114, 123.

Next, an outline of an operation of the FIG. 2 illustrative embodiment is described. First, a description is made of a case where the game machine is independently utilized. In this case, the cartridge 30 is loaded into the game machine 20 (connection is made between the connector 22 and the connector 32). When the power switch (not shown) is turned-on, the CPU 21 executes an initial setting on the basis of the initial setting program stored in the ROM 31 and then executes a game processing based on the game program, whereby image data for displaying game images is generated. At this time, if the player instructs a moving direction and/or action of a hero character appearing in the game by operating the operating portion 23, the CPU 21 changes the moving direction and/or action of the hero character based on the player instruction according to the game program. The game image according to a result of such processing by the CPU 21 is displayed on the LCD 26.

On the other hand, in a case where the interactive game associated with the electronic game machine is to be played by use of the trading cards 10, the read-data processing circuit 34 and the data reader 35 are activated prior to play. Then, the player takes an operation required for reading the data recorded on the data recording areas 113 and 114 of the rule card 11 or the data recording area 123 of the character card 12A, 12B (e.g. parallelly-moving the trading card 10 in proximate state to the data-reader 35 in a case of the two-dimensional barcode recording) by parallelly-moving the trading card 10 by hand scan. In response to the operation, the data reader 35 reads the data recorded on the card. More specifically, the CCD sensor dissolves the dot data of the two-dimensional barcode into column unit data so as to convert the dot data into the bit series data, and by sequentially repeating such a conversion in the movement direction, the two-dimensional (planer) data is converted into one-dimensional (bit series) data. The read one-dimensional data is dissolved into 1-byte-unit data by the read-data processing circuit 34 such that the data can be written into the RAM 33, and the 1-byte-unit data is further rearranged in the order of the block No. of the two-dimensional barcode (subjected to a data format conversion) to be applied to the CPU 21, and then, written to the RAM 33 by the CPU 21.

Figure 4:
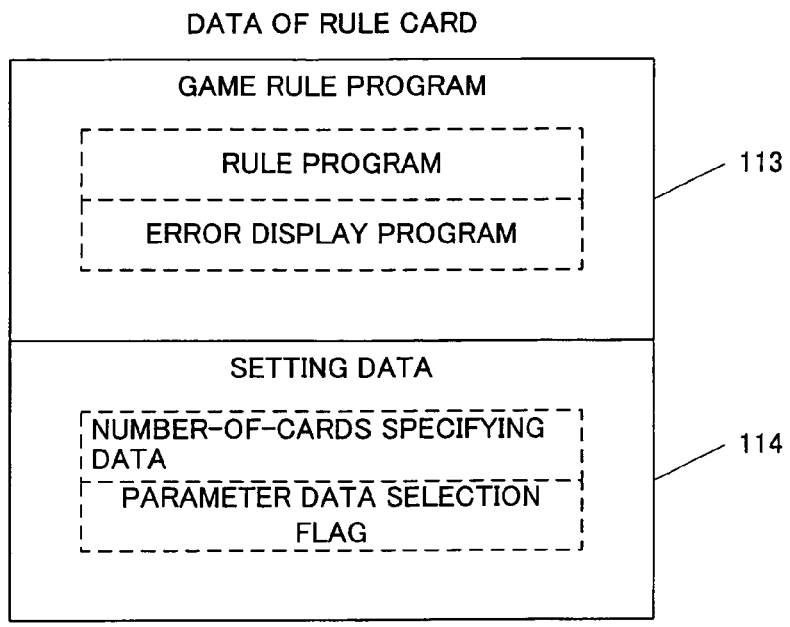
FIG. 4 is an illustrative view showing data recorded in a data recording area of a rule card included in the trading cards.

FIG. 4 is an illustrative view showing rule data and setting data recorded on the data recording areas 113 and 114 of the rule card 11. In FIG. 4, the data recording area 113 is recorded with a rule program such as an error display program and etc. for realizing an interactive game using the trading cards 10. The data recording area 114 is recorded with the setting data such as number-of-cards specifying data (or flag), parameter selection data (or selection flag), etc. The number-of-cards specifying data is set with the number of the character cards useable in the interactive game. The parameter selection data is recorded with data for selecting the kind of the parameter to be utilized in the interactive game from parameters recorded in the data recording area 123 of the character card 12. The kind and the number of parameters to be selected differ depending on the kind of the rule card 11.

Figure 5:
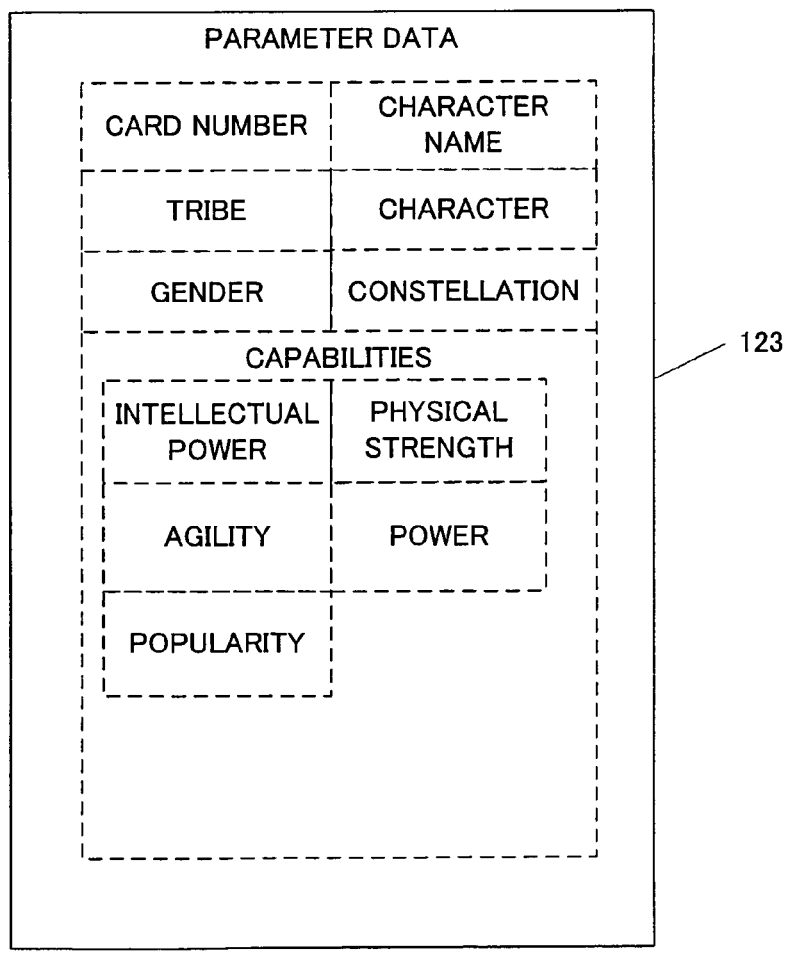
FIG. 5 is an illustrative view showing data recorded in a data recording area of a character card included in the trading cards.

FIG. 5 is an illustrative view showing the parameter data recorded in the data recording area 123 of the character cards 12A and 12B. In FIG. 4, parameter data is recorded on the data recording area 123. The parameter data includes a card No., a character name, a tribe, character, gender, constellation, ability data and etc. The ability data includes intellectual power, physical strength, agility, power, popularity, etc.

These parameter data (including the ability data) differ depending upon the type of the trading cards and relation with the rule card 11. In FIGS. 1A to 1C, FIG. 4 and FIG. 5 embodiments, a description is given of an animal card; however, where the technical idea of the present invention is applied to a monster card, or other card, various abilities and techniques (physical strength, agility, decisive attack, affinity with another monster) in each kind of monster are set as the parameter data.

Figure 6:
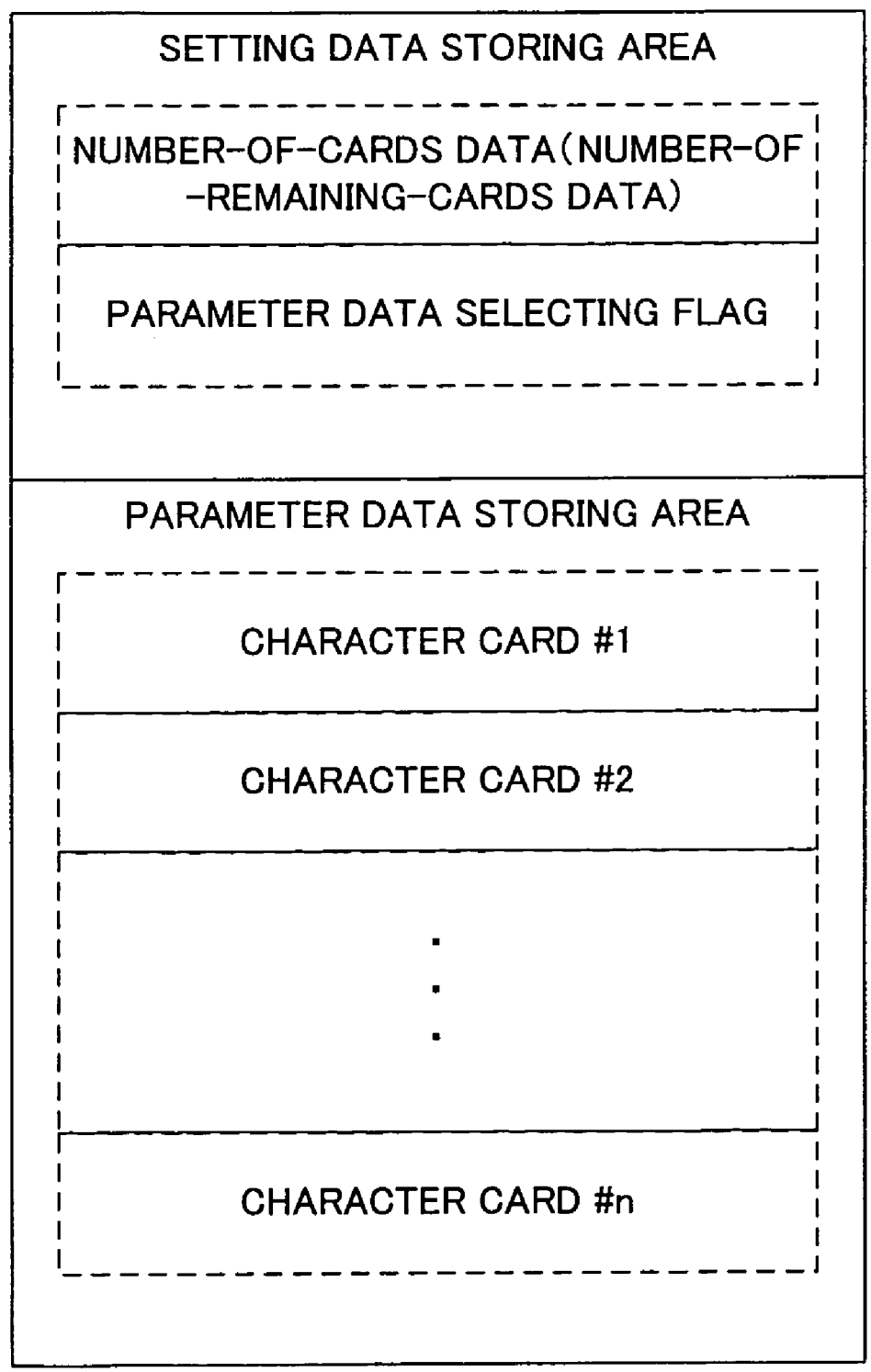
FIG. 6 is an illustrative view showing a memory map of a RAM included in the cartridge.

FIG. 6 is an illustrative view showing a memory map of the RAM 33 (or flash memory). In FIG. 6, the RAM 33 includes a setting-data storing-area and storing areas for storing parameters of a predetermined number of character cards 12A, 12b. The setting data recording area temporarily stores setting data read from the rule card 11, that is, data set with a parameter to be used for the interactive game (e.g., physical strength or endurance and agility or turn of speed) from a plurality of types of parameter data of each of character cards 12A, 12B.

Figure 7:
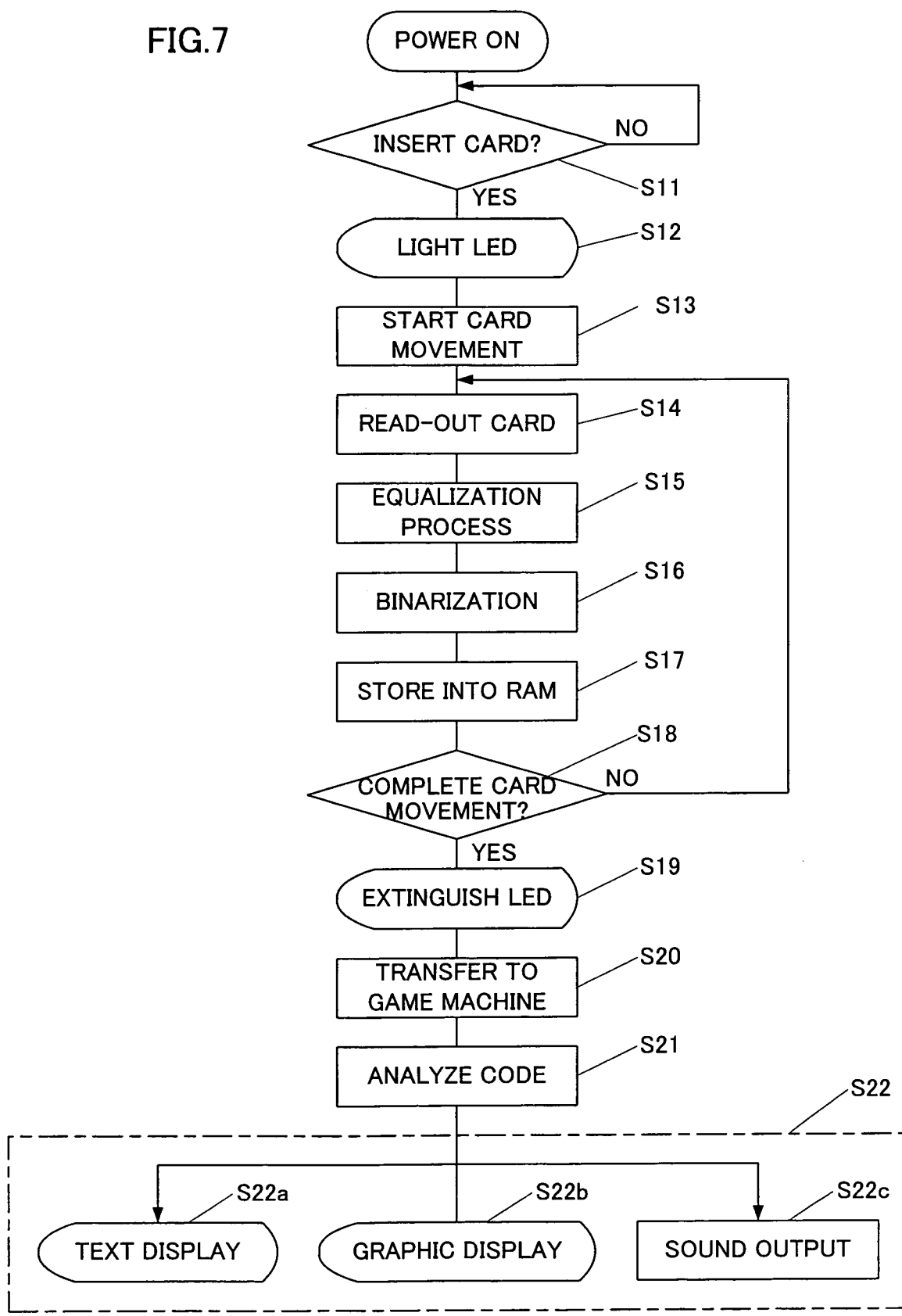
FIG. 7 is a flowchart showing one example of an operation of a card reader and a read-data processing circuit.

FIG. 7 is a flowchart explaining an exemplary operation of the card reader 35 and the read-data processing circuit 34 (or the process by the CPU 341). When the power switch (not shown) of the portable game machine 20 is turned-on, the CPU 341 starts the operation of FIG. 7 on the basis of the program of the ROM 342.

In a step S11, it is determined on the basis of an output of the card sensor 351 whether or not a trading card 10 insertion has been detected. If no insertion is detected, the card sensor 351 waits to detect a trading card 10. When a trading card 10 (rule card 11 or character cards 12A, 12B) is inserted in the guide 361, the card sensor 351 detects the trading card 10. In response thereto, in a step S12, the light-emitting diode (LED) 352 is driven for lighting. In a step S13, the player starts to move the trading card 10 along the guide 361, moving it along a side forming the data recording area 113, 114, 123. In a following step S14, the CCD sensor 353 optically reads the data recorded in the data recording areas 113, 114 and 123 by two-dimensional barcode scheme. In a step S15, the data read by the CCD sensor 353 is subjected to an equalization processing by the read control circuit 354, and in a step S16, this data is converted into binary data of "1" or "0" on a dot-unit basis. In a step S17, the CPU 341 converts the binary data on a column-unit basis into a predetermined format having one block of data column, and writes and stores it in the RAM 343. In a step S18, it is determined whether or not the trading card movement 10 has been completed. That is, if the card sensor 351 is in a period where the trading card 10 is being detected, the process returns to the above described step S14 so as to repeat the operation of the steps S14 to S18 until the trading card 10 is not detected. The operation of the steps S14 to S18 is repeated until all the block data recorded in the data recording area 113, 114 and 123 have been read out.

Then, if a completion of card movement is detected in the step S18, the process proceeds to a step S19 so as to turn-off the light-emitting diode 351. The data recorded in the data recording areas 113 and 114 of the rule card 11 and/or the data recording area 123 of the character card 12A . . . is thus read and temporarily stored in the RAM 343. In a following step S20, the record data of one rule card 11 and/or the character card 12A stored in the RAM 343 is sequentially read out by the CPU 341 and transferred to the portable game machine 20 through the bus conversion circuit 344, and the connectors 32 and 22. At this time, the CPU 21 temporarily stores the read data transferred from the cartridge 30 into the RAM 24. In a step S21, the CPU 341 analyzes the read data stored in the RAM 24.

It is noted that where the data recording areas 113 and 114 are formed along the opposite two sides (into two locations) of the trading card 10 (rule card in FIG. 1), or where formed along the three sides (in three locations) of the trading card 10, or where formed along the four sides (in four locations) of the trading card 10, the process of the steps S11 to S21 is repeated according to the number of the locations. Also, even if the direction and/or order of reading each trading card 10 is changed, because block Nos. are recorded in the blocks included in the respective data recording areas 113, 114 and 123, the read-out data of the blocks can be rearranged in the order of the block No. after reading all the blocks and temporarily stored in the RAM 343.

Thereafter, in a step S22, the CPU 21 performs a process for adding a change according to the analyzed read data onto the process based on the inherent game process on the basis of the analyzed read data temporality stored in the RAM 24 and the program stored in the ROM 31. As the change-adding process, if the data recorded in the data recording areas 113, 114 or 123, for example, is text data, a process for displaying read-out letters or a text on the LCD 26 is performed (step S22*a*). Furthermore, where the data recorded in the data recording areas 113, 114 and 123 is graphic (or dot) data, the graphic data is displayed on the LCD 26 (step S22*b*). In addition, where the data recorded in the data recording areas 113, 114 and 123 is sound data, such as cry or call of animal, the sound data is digital-analog (DA) converted and output as a sound from the sound output portion 28 (step S22*c*). Although processes or operations are possible depending upon the kind of read data, the process or operation is determined depending upon the record data in the data recording areas 113, 114 and 123 and the program in the ROM 31.

Various games are to be thought of as an electronic game using the data read out of the data recording areas 113, 114 and 123 of the trading card 10 or a combined (interactive) game of trading cards and an electronic game (step S22), and an example thereof is explained in detail below.

Figure 8:
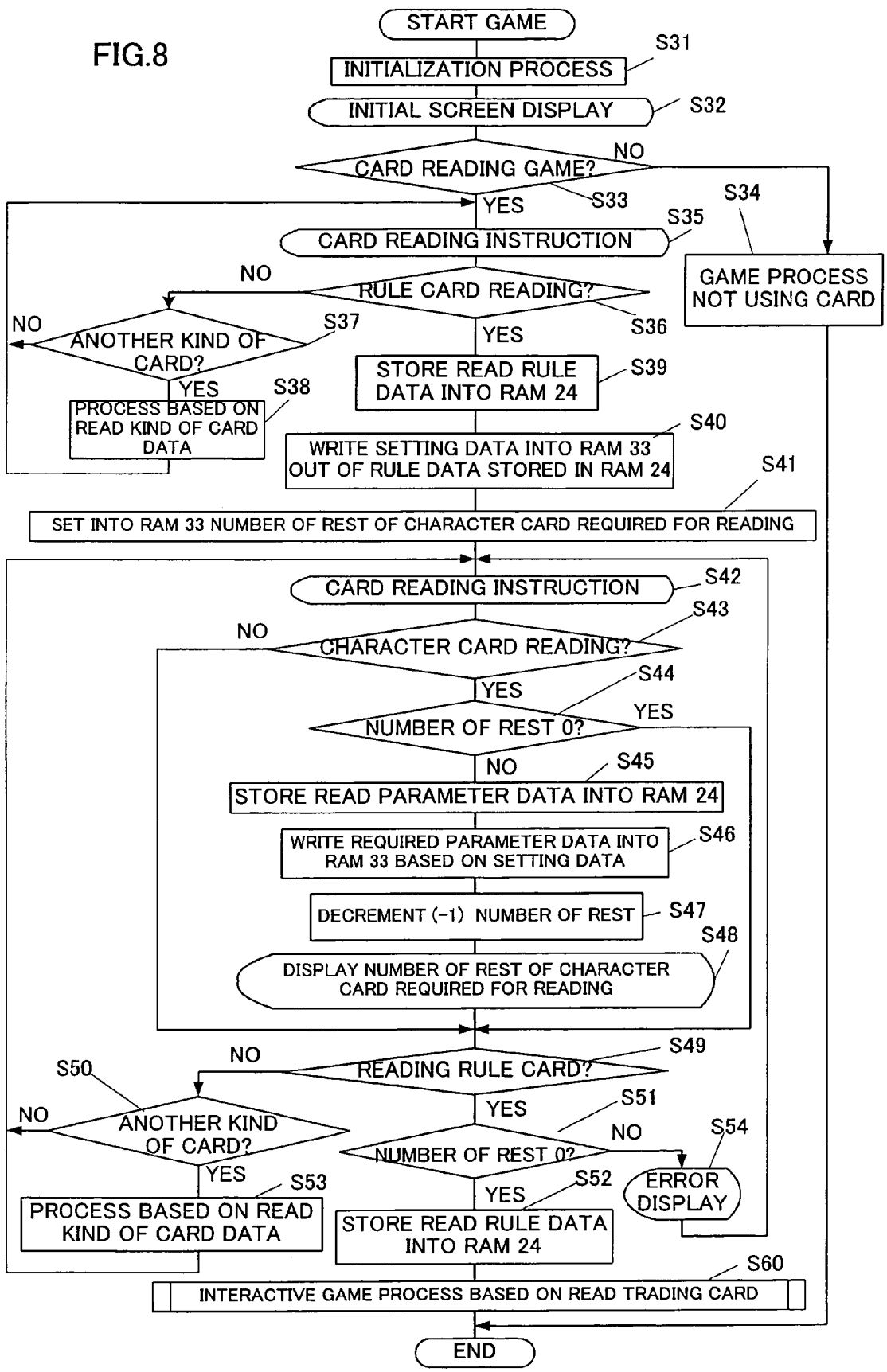
FIG. 8 is a flowchart showing one example of a main routine of a game process.
Figure 9:
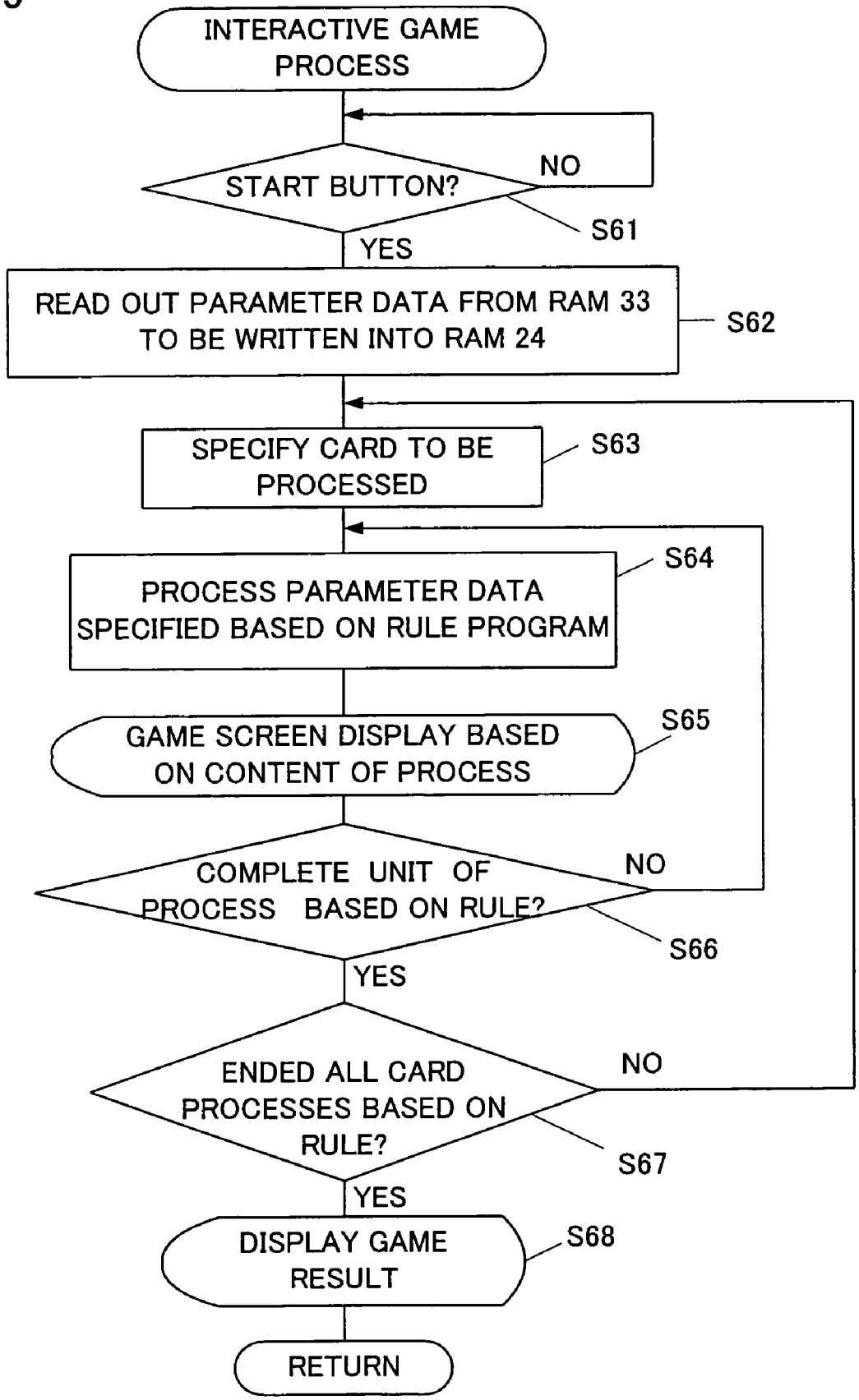
FIG. 9 is a flowchart showing an interactive game subroutine.
Figure 10:
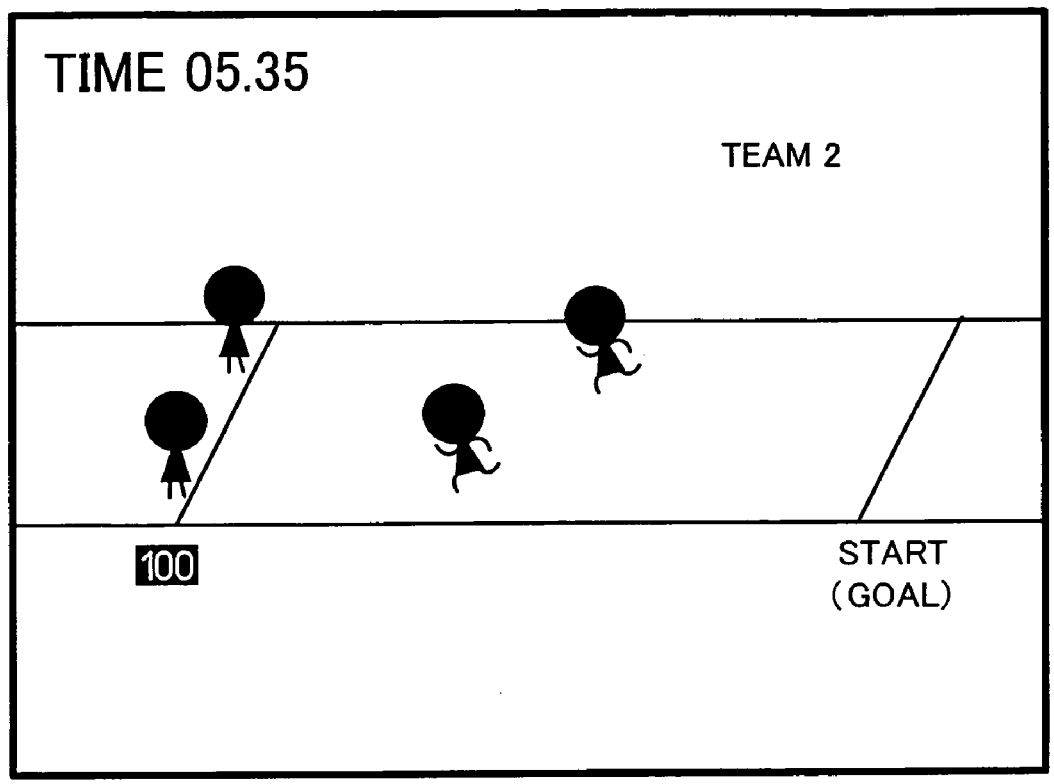
FIG. 10 is an illustrative view showing a display example of a game screen of the interactive game.

FIG. 8 shows a flowchart as an example of the game process, FIG. 9 shows a flowchart as an example of an interactive game process, and FIG. 10 shows a display example of an interactive game (Swedish Relay). In the following, the description is made referring these figures for a specific operation of an electronic game using the trading cards.

First, as an example of the interactive game, a description is simply made of a game rule and an arrangement for an instance of the Swedish Relay shown in FIG. 10. As a game rule, a first team is matched against a second team, and both teams field three runners, i.e., a first to third runners. As parameter data to be selected and set, physical strength (endurance) and agility (turn of speed) are utilized. Herein, the physical strength is generally inversely proportional to the agility. That is, a runner high in physical strength and endurance is low in agility (strength or turn of speed) and conversely, a runner low in physical strength and endurance is high in agility (strength or turn of speed), and in rare case, some characters are high or low in both abilities. Therefore, a runner who has a high parameter value in agility is suited to be the first runner, and runners who have a high parameter value in physical strength are suited to be the second and third runners.

Accordingly, as an exemplary order of reading the cards, the data recording area 114 of the rule card 11 recorded with the setting data is read first, and then the data recording areas 123 of three character cards (e.g., 12A to 12C) to be the first to third runners in the first team are read. Then the data recording areas 123 of three character cards (e.g., 12D to 12F) to be the first to third runners in the second team are read, and finally, the data recording area 113 of the rule card 11 recorded with the rule data is read.

More specifically, each of players leading the first team and the second team selects a card having a parameter superior in physical strength and/or agility (strength or turn of speed) from among his own characters (cards) and considers in which order the characters should be put so as to be the first through third runners. Then, the parameter data in the data recording areas 123 of the character cards is read in the order of the first to the third runners. It is noted that the parameter data recorded in the data recording area 123 is not preferably visually recognizable and therefore, it is possible for the player to plot one's strategy of the Swedish Relay after learning each item of parameter data for each card No. on the basis of experiences obtained after performing the interactive game utilizing the same character cards several times.

Prior to game start, the player loads the cartridge 30 on the game machine 20 and then turns-on the power switch (not shown). In response thereto, the CPU 21 executes the following processes on the basis of the program stored in the ROM 31. That is, in a step S31, an initialization process, e.g. initially clearing the RAM 24, transferring the backup data stored in the RAM 33 to the RAM 24 and so on is performed. In a step S32, a mode selection screen at a start of the game is displayed. In this mode selection screen, the display shows a selection of any of the game modes for playing an electronic game not using the trading cards 10 or an interactive game associated with the electronic game using the trading cards 10. According to the display, the player performs a selecting operation. In a step S33, it is determined whether or not the interactive game with the trading cards 10 is selected. In a case that it is determined that a game mode for playing an electronic game not using the trading cards 10 is selected, the process proceeds to a step S34 to process the program for an electronic game machine alone (or usual game) stored in the ROM 31. Thereby an image display and sound output based on the process are performed and then completed. This process is similar to the conventional portable game, hence detailed explanation is omitted here.

On the other hand, if it is determined that the interactive game with the trading card 10 has been selected in the above-described step S33, the process proceeds to a process after a step S35. That is, in the step S35, a display instructing an operation for reading the trading card 10 (e.g., "Let Card Data Read", etc.) is shown as a program process, from programs stored in the ROM 31, for playing the interactive game with the trading card 10. According to the display, the player moves the trading card 10 along the guide 361 so as to read the data recorded on the data recording area. Next, in a step S36, it is determined whether or not the data of the rule card 11 has been read. This determination is made by determining whether or not data read from the data recording areas 113, 114 and 123 is data recorded on the rule card 11 while accessing the RAM 343 by the CPU 21. When it is recognized that the data is not rule card 11 data, it is determined whether or not the data is another kind of game card data in a step S37. If it is determined the data is not another kind of game card (if it is character cards 12A to 12F), the process returns to the step S35. If it is determined the data is another kind of game card, a process based on the read card is performed in a step S38, and then, the process returns to the step S35 so as to wait for a reading operation of the rule card 11 by the player.

On the other hand, when it is determined reading of the rule data 11 has been performed in the step S36, all the data read from the data recording areas 113 and 114 is temporarily stored in the RAM 24 in a step S39. In a step S40, the setting data (data for specifying which item of setting data is to be read out of the setting data recorded in the data recording area 123 of the character card 12A) is transferred from the RAM 24 to the RAM 33 and temporarily stored in the RAM 33. Furthermore, in a step S41, the number-of-cards data (number-of-cards data of the character cards to be read or the rest of cards data in a series of the interactive game) out of the rule data read from the card is transferred from the RAM 24 to the RAM 33 to be temporarily stored in the RAM 33.

In a following step S42, a message instructing an operation for reading the data recording area 123 of the trading card 10 (rule card 11 or character card 12A) is displayed. Viewing the message display, the player performs an operation for reading out a next trading card 10 (since the rule card 11 has read, a next card is actually any one of character cards 12A to 12F). In response thereto, in a step S43, when it is recognized that data of the character cards 12A to 12F has been read out, it is determined whether or not the remaining number of cards is zero. When it is determined that the remaining number of cards is not zero, all the parameter data read from the data recording area 123 of any one of the character cards is stored in RAM 24 in a following step S45. In a step S46, the selected parameter data to be utilized in the interactive game is written to the RAM 33 on the basis of the setting data (or parameter data selection flag). In a step S47, the number-of-cards data stored in the RAM 33 is subtracted by one so as to be stored and renewed as the remaining number-of-cards data. In a step S48, the remaining number of cards required to be read of the character cards is displayed on the LCD 26. Viewing this, the player sequentially repeats the process so as to read the character cards corresponding to the remaining number of cards. Therefore, in a step S49, it is determined the data is not the rule card 11, it is determined the data is not another kind of data in a step S50, and then, the process returns to the step S42.

By repeating the operation from the above-described steps S42 to S50, a predetermined number (6 in an example of the Swedish Relay shown in FIG. 10) of character cards 12A to 12F are read. Thus, after reading the parameter data of 6 sheets of character cards 12A to 12F, the parameter data of the character cards 12A to 12C in the first team is stored in areas corresponding to the card No. 1 to 3 in the RAM 33, and the parameter data of the character cards 12D to 12F in the second team is stored in the areas corresponding to the card No. 4 to 6 in the RAM 33.

Next, when a reading operation of the rule data recorded in the data recording area 113 of the rule card 11 is performed by the player, the game machine determines, in the above-described step S43, that the data is not the character card data. Thus, it is determined in the step S49 that the rule data of the rule card 11 is read and then the process proceeds to a step S51. In the step S51, it is determined the remaining number of cards is zero. In a step S52, the read rule data is stored (held) in the RAM 24. Thereafter, the process proceeds to an interactive game subroutine (see FIG. 9 described later) based on the read trading card 10 in a step S60.

Noted that when it is determined in the above-described step S51 that the rest of the number of cards is not zero, the machine determines that the rule card 11 has been erroneously read prior to the number of character cards rule has been read, and an error display is made in a step S54. Thereafter, the process returns to the step S42 to wait for a reading of the predetermined number of character cards. Furthermore, when another kind of card (i.e., not the trading cards 10 based on the rule of the Swedish Relay) is determined to have been read in the above-described step S50, a process based on the data of the read kind of card is performed in a step S53.

Next, an operation of displaying the interactive game such as the Swedish Relay shown in FIG. 10 is described according to FIG. 9 flowchart. The description uses the setting data, the parameter data of each character and the rule data read from the rule card 11 and the predetermined number of character cards 12A to 12F according to the process shown in FIG. 8.

To start the interactive game after reading the various kinds of data of the trading cards 10, the player depresses a start button included in the operation switch 23. In a step S61, the machine waits for the depression of the start button, and when is the machine determines that the start button is depressed, the process proceeds to a step S62. In the step S62, the parameter data of a predetermined number of character cards (6 in FIG. 10 display example) is read from the parameter data recording areas of the RAM 33 so as to be written to the RAM 24. In a step S63, a card to be processed is specified (In FIG. 10 example, first, the character card 12A corresponding to the first runner in the first team and the character card 12D corresponding to the first runner in the second team are specified). In a step S64, processing based on the parameter data (physical strength and agility) of the specified character cards 12A and 12D is performed on the basis of the rule program (rule data recorded in the data recording area 13 of the rule card 11 and temporarily stored in the RAM 24). In a step S65, a game image is displayed on the LCD 26 of the portable game machine 20 on the basis of a processing content (or processing result). More specifically, a moving distance per a unit of time as to the first runner in the first team is calculated on the basis of the physical strength and the agility of the parameter data recorded in the character card 12A, and on the basis of the result, a process is performed such that the first runner in the first team is gradually moved by the distance. At approximately the same time, the moving distance per a unit of time as to the first runner in the second team is calculated on the basis of the physical strength and the agility of the parameter data recorded in the character card 12D, and on the basis of the result, a process is performed such that the first runner in the second team is gradually moved by the distance.

In a following step S66, it is determined whether or not a unit of process based on the rule (e.g., the moving process of the first runner in each team) is completed, and if the unit of process is not completed, the process returns to the step S64 so as to repeat the processing from the steps S64 to S66. Furthermore, if the unit of process is completed, it is determined whether or not processing of all the character cards based on the rule is completed in a step S67. If it is determined all the processing is not completed, the process returns to the step S63 so as to repeat the processing from the steps S63 to S67.

Specifically, by the above-described process, a display process is made such that the respective first runners in the first team and the second team run 100 meters so as to relay the second runner on the basis of the parameter data of the character card 12A and the character card 12D. Then, when the first runner in any one of the first team and the second team runs 100 meters so as to relay the second runner, it is determined the unit process on the basis of the rule is completed in the above-described step S66, and in step S67 it is determined that the process of all the character cards based on the rule has not been completed. Thus, the process returns to the step S63 so as to specify a character card (e.g., 12B) corresponding to a second runner in a team having completed a relay leg (e.g., first team) and performs a process based on the parameter data of the character card. That is, as to the first team, a calculation process to display the second runner is performed, and as to the second team, a calculation process to continue to display the first runner is performed. In addition, when the first runner of the second team relays to the second runner of the second team, a calculation process to display the second runner in the second team is performed. In this case, the running distance of the second runner in each team is, for example, 200 meters (double the distance of the first runner).

Furthermore, when the second runners of the respective teams run 200 meters (a total running distance reaches 300 meters), the character cards corresponding to the third runners 12C and 12F are specified, and a process based on the parameter data of the character cards is performed. Then, when the third runners in the respective teams run 300 meters (a total running distance run by the first to third runners reaches 600 meters), it is determined the process of all the character cards 12A to 12F based on the rule has been completed in the step S67, the process proceeds to a step S68. In the step S68, a game result is displayed. For example, a winner display for a team whose third runner finished first is made, and then, the process returns to a main routine (FIG. 8).

As described above, the data recorded on the trading cards 10 including the rule card 11 and the character cards 12A, 12B, is read, and on the basis of the read data, an interactive game using the portable game machine 20 and the trading card 10 is performed. Thus, simply by purchasing additional character cards, it is possible to perform the interactive game utilizing different parameter data, and by adding a different kind of rule card, it is possible to change a game content of the interactive game. That is, simply by adding a low-cost trading card 10, it is possible to enjoy the interactive game having a different game content without newly purchasing a game cartridge 30. Furthermore, it is possible for the player to collect the trading cards so as to increase the variety and therefore to enhance willingness to collect the trading cards.

Although the description has been made for a case where the rule data recorded on the trading card is Swedish Relay in the above-described embodiment, the technical idea of the illustrative embodiments can be applied to various kinds of interactive games. For example, where the game cartridge is a baseball game and where the trading card is a baseball card, the character card is recorded with, in addition to a baseball player's picture, his batting average, the number of home-runs, the number of times at bat and etc. as parameter data, and the rule program data of the rule card is set such that home-run derby and competition of the number of hits are performed.

Furthermore, where the trading card is a soccer card, the character card is recorded with a soccer player's picture, the number of goals, a success rate of goal and etc. as the parameter data, and a shoot-out is competed utilizing such the parameter data.

In addition, where the game content concerns a role-playing game or an action game, the character may be a game-appearing person, animal or imaginary animal or plant while the parameter data is appearing-person's life, power, ability, available items (weapons, guards, magic) and so on.

Although a description was made of the portable game machine having an LCD as one example of a game machine in the above-described example, the technical idea of the illustrative embodiments is not limited to such structure but applicable to the games using a video game machine or a personal computer. In such a case, the storage data on the ROM 31 of the cartridge 30 is stored in an information storage medium for a video game machine, e.g. memory cartridge, magnetic disk, CD-ROM or DVD (digital versatile disk) or the like. The data reader 35 and the read-data processing circuit 34 will be connected integrally with or externally from the video game machine or personal computer.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. Trading cards used interactively with an electronic game machine including an external information reader which reads data recorded on the trading cards, a processor which processes the data read by the external information reader, and an image display which displays an image based on a processing result by said processor, wherein
said trading cards includes at least one rule card and a plurality of character cards,
each of said plurality of character cards is used for playing an electronic game using the character cards, and is formed with:
a first data recording area recorded in a machine-readable manner with character specific parameter data on one main surface thereof, and
a first visual information recording area in which identifying information identifying a kind of the character card and character information are recorded in a visually recognizable manner on at least one of said one main surface and other main surface,
said rule card is formed, on one main surface thereof, with a second data recording area in which rule program data for programming a rule of the game utilizing said trading cards is recorded in a manner that the same is machine-readable by said external information reader, whereby
an interactive game is playable by making said external information reader read said at least one rule card and said plurality of character cards.

2. Trading cards according to claim 1, wherein each of said plurality of character cards has said first visual information recording area formed on the one main surface different from the main surface formed with said first data recording area.

3. Trading cards according to claim 1, wherein each of said plurality of character cards has said first visual information recording area formed on the main surface different from the surface formed with said first data recording area, and character information which has a smaller size than the character information recorded in said first visual information recording area and which is the same as the character information that is recorded at a blank portion on the same surface as said first data recording area.

4. Trading cards according to claim 1, wherein the character information recorded in said first visual information recording area is a character figure, and text information in relation to said character figure is further recorded on the main surface formed with said first data recording area.

5. Trading cards according to claim 1, wherein said rule card is formed with a second visual information recording area in which information that causes an inclination to collect is recorded in a visually recognizable manner and which is formed on a surface different from the main surface formed with said second data recording area.

6. Trading cards according to claim 4, wherein said rule card is recorded in a visually recognizable manner with descriptive information relating to a rule of the electronic game on the main surface formed with said second data recording area.

7. Trading cards according to claim 1, wherein
each of said plurality of character cards is recorded with a plurality of kinds of parameter data in said first data recording area, and
said rule card is, on the main surface formed with said second data recording area, recorded with setting data for setting a kind of parameter data to be read, prior to start of the game utilizing said trading cards, from among said plurality of kinds of parameter data recorded in said parameter data recording areas of said character cards.

8. Trading cards according to claim 1, wherein
each of said plurality of character cards is recorded with a plurality of kinds of parameter data in said first data recording area,
said rule card is, on the main surface formed with said second data recording area, further formed with a third data recording area in which setting data for setting a kind of parameter data, to be read, prior to start of a game utilizing said trading cards, from among said plurality kinds of parameter data recorded in said parameter data recording areas of said character cards, is recorded in a manner that the same is readable by said external information reader.

9. Trading cards according to claim 1, wherein the rule of the game programmed by the rule program data recorded on the rule card defines a rule of competition between a plurality of characters in the electronic game.

10. Trading cards according to claim 9, wherein the rule of competition defines a rule of a home-run derby in a baseball electronic game.

11. Trading cards according to claim 9, wherein the rule of competition defines a rule in a relay race between characters.

12. Trading cards associated with an electronic game machine including an external information reader which reads data recorded on the trading cards, a processor which processes the data read by the external information reader, and an image display which displays an image based on a processing result by said processor, wherein said trading cards includes at least one rule card and a plurality of character cards, each of said plurality of character cards is used for playing an electronic game using the character cards, and is formed with:

a first data recording area recorded in a machine-readable manner with different kinds of parameters specific to the character on one main surface thereof, and a first visual information recording area in which identifying information for identifying a kind of the character card and character information are recorded in a visually recognizable manner on at least any one of said one main surface and other main surface, said rule card is formed with:

a second data recording area, on one main surface thereof, in which rule program data for programming a rule of a game utilizing said trading cards is recorded in a manner that the same is machine-readable by said external information reader, and a third data recording area, on the main surface formed with said second data recording area, in which setting data for setting a kind of parameter data, to be read, prior to start of a game utilizing said trading cards, from among plurality of kinds of character specific parameter data recorded in said first data recording areas of said character cards, is recorded in a manner that the same is machine-readable by said external information reading reader, whereby an interactive game is playable by making said external information reader read said at least one rule card and said plurality of character cards.

13. Trading cards according to claim 12, wherein the rule of the game programmed by the rule program data recorded on the rule card defines a rule of competition between a plurality of characters in the electronic game.

14. Trading cards according to claim 13, wherein the rule of competition defines a rule of a home-run derby in a baseball electronic game.

15. Trading cards according to claim 13, wherein the rule of competition defines a rule in a relay race between characters.

16. A game system for performing an interactive game associated of trading cards with an electronic game machine utilizing at least one rule card and a plurality of character cards, wherein each of said plurality of character cards is used for playing an electronic game using the character cards, and is formed with:

a first data recording area recorded in a machine-readable manner with character specific parameter data on one main surface thereof, and a first visual information recording area in which identifying information for identifying a kind of the character card and character information are recorded in a visually recognizable manner on at least any one of said one main surface and other main surface, wherein said rule card is, on one main surface thereof, formed with a second data recording area in which rule program data for programming a rule of a game utilizing said trading cards is recorded in a manner that the same is machine-readable by said external information reader, said electronic game machine includes:

the external information reader which reads the parameter data recorded in said first data recording area of said each character card and the rule program data recorded in the said second data recording area of said rule card, a program data storage which stores program data, a processor which processes each of the data read by said external information reader according to said program data, and a display which displays an image based on a processing result of said processor, wherein a process of said processor makes said external information reader read said at least one rule card and said plurality of character cards, so that said processor makes said display game image data generated based on the rule program data recorded on the rule card by utilizing the parameter data stored in said character card.

17. A game system according to claim 16, wherein said rule card records, in said second data recording areas a determining program for determining a predetermined relation with said character card and an error display program for displaying an error message, and said processor executes said determining program read from said rule card, and executes said error display program when the predetermined relation is not determined on the basis of the data read from said character card.

18. A game system according to claim 16, wherein said plurality of character cards are recorded with a plurality of kinds of parameter data in said first data recording area, and said rule card is, on the main surface formed with said second data recording area, recorded with setting data for setting a kind of parameter data, to be read, prior to start of a game utilizing said trading cards, from among said plurality kinds of parameter data recorded in said first data recording areas of said character cards.

19. A game system according to claim 18, wherein said rule card includes as the setting data number-of-cards specifying data for specifying the number of said character cards required for reading and kind selection data for determining to selectively read at least one kind of parameter data included in said plurality of kinds of parameter data recorded on said character card, and said processor, when the setting data is read by said external information reader, makes said display the number of said character cards to be read on the basis of said number-of-cards specifying data and performs a process combining a predetermined kind of parameter data with said rule program data on the basis of said kind selection data.

20. A game system according to claim 16, wherein each of said plurality of character cards is recorded with a plurality of kinds of parameter data in said first data recording area, said rule card is, on the main surface formed with said second data recording area, further formed with a third data recording area in which setting data for setting a kind of parameter data, to be read, prior to start of a game utilizing said trading cards, from among said plurality of kinds of parameter data recorded in said first data recording areas of said character cards, is recorded in a manner that the same is readable by said external information reader.

21. A game system according to claim 16, wherein said rule card records in said second data recording area the number-of-cards data of said character card required for performing an interactive game with said electronic game machine, and said processor calculates the number of cards of said read character cards on the basis of the number-of-cards data read from said rule card, and activates reading of said character cards until a predetermined number of cards is reached.

22. A game system according to claim 16, wherein said rule card includes a plurality of kinds each of which is formed with rule program data having a different rule in the second data recording area, and said processor makes said display an image for an electronic game based on the different rule program data read from said rule card depending upon the kind of said rule card read by said external information reader.

23. A game system according to claim 16, wherein said rule card records as rule program data a rule data set such that a display content of the game image by said display is different depending upon a different reading order of the parameter data recorded in each of said plurality of character cards.

24. A game system according to claim 16, wherein the rule of the game programmed by the rule program data recorded on the rule card defines a rule of competition between a plurality of characters in the electronic game.

25. A game system according claim 24, wherein the rule of competition defines a rule of a home-run derby in a baseball electronic game.

26. A game system according to claim 24, wherein the rule of competition defines a rule in a relay race between characters.

27. In an electronic game machine including an external information reader which reads data recorded on trading cards, a processor which processes the data read by the external information reader and an image generator which generates images for display based on a processing result by said processor, a method comprising:

reading, with the external information reader of the electronic game machine, a plurality of character trading cards, each of said plurality of character trading cards having machine-readable character specific parameter data and human-readable visual information which identifies character information;

reading, with the external information reader of the electronic game machine, a rule trading card having machine-readable rule program data for programming a rule of a game;

processing, with the processor of the electronic game machine, the data read from the plurality of character trading cards and the rule trading card, to generate images for gameplay of the game.

28. A method according to claim 27, wherein the machine-readable character specific parameter data and the human-readable visual information which identifies character information of each of said plurality of character trading cards are located on opposite sides of that character trading card.

29. A method according to claim 28, wherein the human-readable visual information on each of the character trading cards includes a character figure, and each of the character trading cards further includes text information in relation to said character figure.

30. A method according to claim 28, wherein the rule trading card includes human-readable visual information, the human-readable visual information being located on the opposite side of the rule trading card on which the machine-readable rule program data is located.

31. A method according to claim 30, wherein the human-readable visual information on the rule trading card includes descriptive text information relating to a rule of the game.

32. A method according to claim 27, wherein, in addition to the machine-readable rule program data, the rule trading card has machine-readable setting data for setting a type of parameter data to be read from the character specific parameter data recorded on the character trading cards prior to the start of the game.

33. A method according to claim 27, wherein the machine-readable character specific parameter data on the plurality of character trading cards represents a plurality of different types of parameter data; and in addition to the machine-readable rule program data, the rule trading card further includes machine-readable setting data for setting a type of parameter data to be read from among the plurality of types of parameter data recorded in the machine-readable character specific parameter data of the character trading cards.

34. A method according to claim 27, wherein the rule of the game programmed by the rule program data recorded on the rule trading card defines a rule of competition between a plurality of characters in the game.

35. A method according to claim 34, wherein the rule of competition defines a rule of a home-run derby in a baseball game.

36. A method according to claim 34, wherein the rule of competition defines a rule in a relay race between characters.

37. A method according to claim 27, wherein, in addition to the machine-readable rule program data, the rule trading card has machine-readable setting data for setting the number of character trading cards to be used in the game.

38. A method according to claim 37, further comprising calculating, with the processor, the number of character trading cards read by the external information reader.

39. A method according to claim 38, further comprising comparing the number of character cards read by the external information reader with the number of character trading cards set by the rule trading card.

* * * * *